April 3, 1934. I. HECHENBLEIKNER 1,953,226
PRODUCTION OF FUEL FROM ACID SLUDGE
Filed Oct. 29, 1931
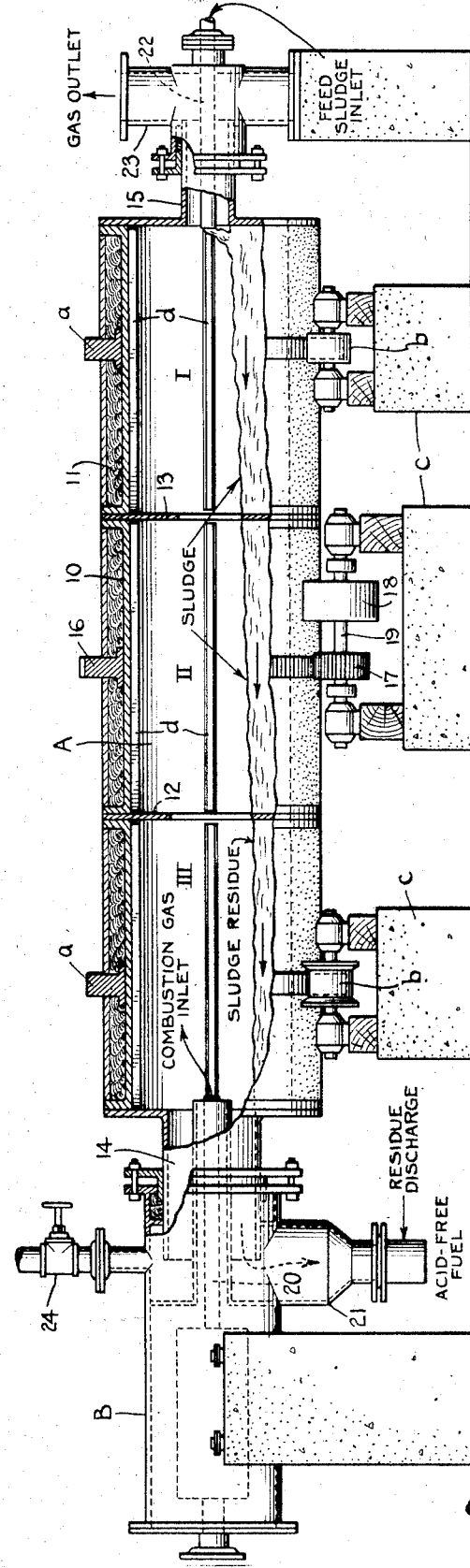
INVENTOR
INGENUIN HECHENBLEIKNER
BY
ATTORNEYS Patented Apr. 3, 1934

1,953,226

UNITED STATES PATENT OFFICE 1,953,226

PRODUCTION OF FUEL FROM ACID SLUDGE

Ingenuin Hechenbleikner, Charlotte, N. C., assignor to Chemical Construction Corporation, Charlotte, N. C., a corporation of Delaware Application October 29, 1931, Serial No. 571,775

10 Claims. (Cl. 44—1)

This invention relates to a method of treating acid sludge; and has special reference to the provision of a method for producing an acid-free fuel of high volatile content from acid sludge.

In the refining of petroleum, tar and other organic materials, the crude oil or its fractional or cracked distillates is treated with sulphuric acid or with oleum which tends to remove the undesirable compounds therein reacting therewith to form a mixture which is separated from the treated oil as a tarry sludge, known as petroleum or acid sludge. This sludge may contain sulphuric acid, sulphonic acids, sulphates, acid tars, and other organic hydrocarbons, the relative proportions of which differ in different sludges and vary according to the nature of the material treated and the strength of the sulphuric acid or oleum used in the treatment.

Various methods of recovering the sulphuric acid from the acid or petroleum sludge have heretofore been suggested and practiced, and various methods for recovering the carbonaceous content of or utilizing the sludge for fuel purposes have been and are being employed.

Among the methods heretofore suggested for recovering the sulphuric acid from the sludge is that which consists in subjecting either acid sludge (unseparated sludge) or separated sludge acid to the action of heat in such a manner as to decompose the sulphuric acid content or its compounds in the sludge, reducing the same to sulphur dioxide; which sulphur dioxide may be subsequently re-converted into sulphuric acid or sulphuric anhydride. In this decomposition method there is usually produced a sludge residue in the form of a cokey substance. While many variations of this method of producing or recovering the sulphur dioxide from the sludge and wherein a cokey residue is obtained have been suggested or proposed from time to time, none of them has to my knowledge been adopted practically or commercially because of the deficiencies or objections which have been found inherent in or which have usually accompanied the proposed practices of this method.

In these prior proposals, it has been suggested to subject the acid sludge (or separated sludge acid) to either direct or indirect heat treatment in a retort, with the object of effecting the decomposition or reduction of the sulphuric acid or the sulphate compounds therein to $SO_2$. This object, however, has heretofore been impossible of attainment without producing such side reactions as substantially vitiated the object or results intended to be produced or/and without such a complication of apparatus and method steps as rendered the method impractical or commercially unworkable. Generally considered, the side reactions resulted in the creation or generation with the produced $SO_2$ gas of solid and vapor impurities which were difficult to handle or remove and which necessitated the use of complicated and expensive filtering, scrubbing and burning equipment for treating these impurities. This treatment consisted in filtering the produced gases to remove dust entrained thereby in the retort, in scrubbing out water vapor, sulphuric acid vapors (mist), $SO_3$ and the heavier and lighter hydrocarbons distilled in the retort and carried over therefrom, and in burning gases consisting principally of hydrogen sulphide, carbon monoxide, the lighter hydrocarbon distillates and sublimed sulphur. Moreover, because of these and other complications, the sulphur dioxide gas produced was generally too weak for commercial use, the same being diluted with such gases as carbon dioxide, nitrogen and the other gaseous components and impurities left untreated by the scrubbers and burning apparatus.

In the practice of this decomposition method in accordance with these prior proposals, the carbonaceous or cokey residue of the sludge was so converted by the process as to render the same relatively useless for fuel or other purposes. This I believe was due to the fact that the reaction temperatures employed were either improperly determined or improperly controlled. Thus where the reaction temperatures employed were too high, there resulted a destructive distillation of the carbonaceous residue coupled with the generation of large amounts of carbon dioxide gas in the produced gases; and in some cases where acid sludge was heated to a red heat, the destructive distillation was carried on to the extent of producing carbon monoxide gas. Thus also where the reaction temperatures were too low or/and under improper control, the carbonaceous or cokey residue obtained was not conditioned for desirable fuel use.

I have discovered that acid sludge may be controllably reacted in a retort to produce $SO_2$ gas of relatively high concentration and substantially free from either solid or vapor impurities and to produce a non-acid fuel in a highly desirable mechanical state which has not been destructively distilled and which therefore has a high volatile content. I have furthermore found that the reactions in the retort may be carried out to accomplish these desiderata by suitably controlling the reaction constituents and conditions, and that the process may be so organized and operated as to permit a quick and ready control of these conditioning factors.

The provision of this improved method for producing an acid-free fuel of a high volatile content and for efficiently generating $SO_2$ gases from acid sludge is therefore the prime object of my present invention.

Acid sludge is at present disposed of commercially in several ways. In some plants the sludge is conveyed directly to the burners and is used as a fuel with no attempt to separate the acid from the sludge. This practice is only followed where the plants are isolated, since the fumes from the stack contain a high percentage of sulphur dioxide and sulphur trioxide gases which when released to the atmosphere create a great nuisance. In some cases the acid in the sludge is first neutralized before burning by the addition of an alkali, but the additional expense limits or prohibits this neutralization method. At other plants the acid sludge produced is treated for acid recovery; and this is usually accomplished by first effecting a so-called separation of the acid sludge. The separation treatment produces a weak acid which is purified and concentrated for re-use, an acid oil containing a proportion of sulphuric acid or its compounds and a tar also containing a proportion of sulphuric acid or its compounds. This acid oil and tar are now ordinarily used as fuel, but the use thereof gives rise to the same objections as the burning of unseparated sludge. The principal objection to the burning of the acid sludge or the separated acid oil and tar has been that the linings and grates as well as the boilers and stills and other parts of the furnaces are eaten through and corroded by the sulphuric acid or its distilled gases. Even where special equipment such as rotary burners have been used for disintegrating and burning these products, the produced combustion gases could not and cannot be used where these gases are cooled to below the condensation point of the sulphuric acid since such cooling results in the corrosion troubles.

In accordance with my present invention, acid sludge, whether of the liquid or more viscous or even of the solid type, may be treated to remove therefrom all of the acid content or compounds in the sludge (which may be and is preferably recovered as sulphur dioxide gas), leaving a sludge residue which is acid-free and which therefore may be employed in ordinary combustion furnaces without the generation of the troublesome $SO_2$ and $SO_3$ fumes incident to the burning of acid sludge, oil or tar. Furthermore, by reason of the method employed, the carbonaceous residue retains the high volatile materials and therefore contains a high thermal value.

To the accomplishment of these objects of the invention and such ancillary objects as will hereinafter appear, my invention consists in the processes and the steps of the processes hereinafter more particularly described and sought to be defined in the claims, reference being had to the accompanying drawing which shows a preferred embodiment of apparatus employed in the practice of the process, and which drawing comprises a front elevational view of the retort apparatus with parts broken away to show the interior subdivision thereof.

The improved method of the present invention centers about the process steps of subjecting acid sludge in a retort to the action of heat so that the organic matter of the sludge is made to react upon all of the sulphuric acid or its compounds in the sludge to convert the same to gases, which are removable from the sphere of reaction, whereby there is produced a sludge residue consisting of an acid-free fuel. By the reaction, all of the sulphuric acid and its compounds in the sludge are reduced to $SO_2$ gas; and in the practice of the improved process, the reacting constituents and the reaction conditions are so controlled as to generate $SO_2$ gas without producing such side reactions as result in the cracking or distillation of the heavy hydrocarbons, the destructive distillation of the carbonaceous residue, the distillation of sulphur, $SO_3$ or sulphuric acid, the formation of dust, the generation of carbon monoxide or carbon dioxide gases, or the ultimate formation or inclusion with the removed $SO_2$ gas of $H_2S$ gas, the reaction being moreover so carried out as to limit the formation to the minimum amount of the lighter hydrocarbons by distillation. There results therefore, in addition to the production or recovery of an $SO_2$ product substantially free of impurities, the production of a granular sludge residue in the form of a very desirable fuel of an acid-free character having a high volatile content.

I have empirically determined that these process steps may be suitably practiced in a retort apparatus such as is shown, for example, in the figure of the drawing, and wherein a body of the petroleum or acid sludge itself (unseparated sludge) is subjected to an internal heat treatment, the internal heat treatment being preferably carried out by directly heating the sludge body with hot combustion gases. The retort apparatus as shown in the figure of the drawing preferably comprises an elongated drum-shaped retort A and a combustion apparatus B associated therewith, combustion gases generated in the apparatus B being injected under suitable pressure into the drum retort A for direct heating contact and reaction with a body of sludge with which the retort is charged.

The retort A preferably comprises a cylinder or drum generally designated as 10 made of iron or steel which if desired may be outwardly covered with a heat insulating material 11, which in turn may be encased in a cement or metal casing, as shown. The drum 10 is preferably interiorly subdivided by means of annular members such as 12 and 13 into a plurality of separate and intercommunicating compartments, three of which are exemplified in the figure of the drawing and designated as I, II and III. The drum retort 10 is provided at its opposite ends with reduced cylinder sections 14 and 15 respectively which serve for the ingress and egress of the reacting constituents and resulting products.

In the preferred practice of the process, the sludge charge in the retort 10 is caused to flow through the compartments I, II and III in seriatim and is thoroughly and continuously agitated as it moves through the compartments so that all parts of the charge are progressively reacted and acted upon by the heating medium. To accomplish these ends the drum retort is preferably mounted for rotation during operation, the drum being provided for this purpose with a gear 16 which is rotated by meshing engagement with a gear 17, bearing for rotation of the drum being provided by the supporting engagement of flanges $a$, $a$ suitably spaced along the drum with grooved and other rollers $b$, $b$ appropriately journalled in concrete spaced standards $c$, $c$ forming the main bed of the retort apparatus. The gear 17 derives power from an external source transmitted to a pulley such as 18 fixed on the gear shaft 19. As the drum A is rotated, the sludge charge therein is agitated and moves from one compartment into the next at a controlled or predetermined speed. Preferably the charge is more thoroughly agitated or "kneaded" by providing flights $d$, $d$ interiorly of the compartments (which elevate and drop the sludge mass during retort rotation) and by introducing iron rods or rails in the compartments which are in turn elevated by the flights and which drop onto the sludge body, acting to break up and pound the viscous and heavy sludge and carbonaceous residue as these are caused to flow through the compartments, and serving to prevent the same from caking, adhering to and building up on the walls of the retort and to facilitate the thorough and uniform treatment of the sludge body.

The construction and design of the retort apparatus may be varied within substantial limits, depending upon a number of factors and mainly upon the capacity of the plant. For a small plant (2 ton acid sludge daily capacity) the retort 10 may for example have an inside length of 8 to 10 feet and an inside diameter of 2 feet. Such a retort may be subdivided into two or three separate compartments of equal dimensions. When subdivided into two compartments a single annular member is used. The internal diameter of the cylindrical end section 14 may be one foot; the diameter of the orifice of the annular member may be 12 to 10 inches; and the internal diameter of the cylindrical end section 15 may be 6 inches, these diameters being thus arranged in progressively decreasing and stepped relationship. The rotational speed imparted to the retort 10 may be of the order of 16 R. P. M. Two flights are preferably provided in each compartment parallel to the walls of the retort 10 and iron rails may also be provided in each compartment for the purpose aforedescribed. Such an apparatus has been successfully employed with combustion gases having an oxygen content of about 2% and liquid sludges have been treated therein, having approximately the following analysis: 53.3% $H_2SO_4$ by titration, 18.8% water, approximately 4% of volatile oils, and the balance heavy hydrocarbon compounds. The temperatures of the entering combustion gases of such a unit are preferably from 1500° to 2000° F.

As an example of a suitable retort construction having a larger capacity such as a 50 ton acid sludge capacity, the retort 10 (made of cast iron or steel) may have a length of about 35 feet and an inside diameter of 4½ feet; the compartments I, II and III thereof may be of equal dimensions with the opening of the annular member 13 about 20 inches and the opening of the annular member 12 about 24 inches, the internal diameters of the cylindrical end sections 14 and 15 being respectively 30 inches and 12 inches. It will be noted here also that the diameters or sizes of the openings of the spaced elements 15, 13, 12 and 14 progressively increase in size, this facilitating the controlled flow of the sludge body and sludge residue to, through and from the retort chambers. If desired, the retort 10 may be also slightly inclined so as to further induce the flow of the sludge and residue through the retort. This flow, however, may be most desirably controlled by predetermining the orifice diameters of the elements 12—15 and by controlling the rotational speed of the retort. The rotational speed of such a unit may be 10 R. P. M.. The temperatures of the entering combustion gases of such a unit are preferably from 1500° to 2000° F.

I have found that the aforesaid desired results of the present process may be attained by controlling the heat treatment of the sludge body and residue in the retort within given temperature ranges and under definite speed and reacting conditions. I have empirically ascertained that this may be most suitably governed and readily controlled by flowing heated gases over the agitated sludge body in the retort, the heated gases being introduced at one end of the retort, and by flowing feed sludge into the sludge body at the other end of the retort, the heated gases and the sludge body being thus brought into contact with each other by movement in generally countercurrent directions. The produced reaction gases are preferably withdrawn or expelled from the retort at the feed sludge intake end thereof and the solid residue of the sludge is preferably withdrawn or removed from the retort at the combustion gas intake end thereof, the combustion and reaction gases being therefore caused to flow through the retort in generally co-current directions.

The cylindrical end section 14 of the retort is therefore made to serve as the intake or entrant end for the combustion gases and the expulsion end for the carbonaceous residue, while the opposite cylindrical end section 15 of the retort is made to serve as the intake or entrant point for the feed sludge and as the exit or expulsion end for the $SO_2$ gas. The section 14 therefore is made to receive the nozzle 20 of the combustion apparatus B and is made to communicate with a hopper 21 for the discharge of the carbonaceous residue, which hopper is sealed at the bottom by means of a slide door or the like. The section 15 is in turn made to receive the feed sludge pipe 22 and is made to communicate with the gas outlet 23. Since the retort chamber 10 is rotatable, the joints between the retort A and the combustion apparatus B at one end and those between the retort and the gas outlet 23 at the other end are suitably packed with some stuffing material such as asbestos or the like, as clearly shown in the drawing. It is highly desirable to make these joints air tight so as to prevent the ingress of atmospheric air into the retort at either end or the loss of gases from the retort.

In the operation of the apparatus thus far described, a relatively weak feed sludge is introduced into the retort through the pipe 22 and into the body of sludge under treatment therein, which sludge body is thoroughly agitated and "kneaded" as it is rotationally moved with the retort and as the sludge body is progressively moved through the retort compartments I, II and III to the residue discharge end 14 of the retort. Hot combustion gases generated in the combustion apparatus B are introduced through the nozzle 20 into the retort and are caused to flow in the opposing direction through the retort chambers for bringing and maintaining the sludge and residue in the retort up to and at the desired temperatures. The reaction gases are caused or induced to flow through the chambers in the direction of combustion gas flow and out through the gas outlet pipe 23.

The essence of this process, as aforesaid, centers about the production and recovery of a commercially useful and treatable $SO_2$ gas and of an acid-free and useful fuel. By means of this apparatus and the operation described, I am enabled to carry out the heat treatment of the sludge uniformly in defined and graduated temperature zones, which zones may be generally said to correspond with the retort compartments I, II and III. It will be understood, however, that while I prefer to subdivide the retort into separate and communicating compartments by means of the annular members 12 and 13, an actual subdivision into separate compartments is not essential, an essence of the invention being the creation of definite as well as controllable reaction zones. The combustion gases may be introduced into the retort at a temperature of about 1600° F., and the flow of the feed sludge as well as the sludge body may be so controlled (along with the control of the combustion gas flow) as to create three zones of reaction, one for the evaporation of water and any light distillates, another for effecting the main reaction of the sludge to reduce the sulphuric acid and sulphate compounds therein to $SO_2$, and a third zone for the final disintegration of the sludge residue and the removal therefrom of any occluded or/and residual gases. I have found that a suitable test point in the creation of these zones is the swelling of the sludge in the compartments I and II, which swelling is the result of the release from the sludge body of the gases of reaction. In the zone of compartment I the temperature range may be, for example when treating a blended liquid sludge, from 212° to 300° F.; in the zone of compartment II this temperature range may be from 300° to 400° F.; while in the zone of compartment III this temperature range may be, for example, from 400° to 420° F.; these temperatures being those to which the sludge and sludge residue are heated by the combustion gases.

The reacting conditions obtained in the retort zones serve to explain the results produced by the process. The combustion gases used may be obtained with any suitable fuel, one that I have used being such city gas as is supplied in Charlotte, North Carolina. The combustion gases entering the retort may desirably contain a small percentage of oxygen, an oxygen content up to 6% having been employed by me with successful results. The combustion gases may be directly impelled into the retort under pressure produced by the blower apparatus associated therewith; and this pressure aids in inducing the flow of the resulting reaction gases through and out of the retort.

The main reaction of the organic matter of the sludge, the combustion gases and the sulphuric acid content of or compounds in the sludge takes place in and around the second reaction zone, although the evolution of $SO_2$ begins at the lower temperatures, the evolution taking place, however, with increasing power until the critical temperature range such as of the order of 380° to 420° F. in the aforementioned example is reached. The direct heating of the sludge body while the latter is in an agitated and broken up state accomplishes a uniform heat treatment and avoids local overheating with its consequent disadvantages in producing side reactions. I have found that with the reacting conditions in the retort, all of the reactable sulphur and the $H_2SO_4$ content and compounds in the sludge are converted and reduced to $SO_2$ gas, there being practically no $SO_3$ gas or sulphuric acid mist present in the exit gases. The exit gases are also found to be free of any sublimed sulphur. The produced $SO_2$ gases are of high concentration, such for example as 14% $SO_2$. The produced gases furthermore contain but a small amount of volatile oil and a minimum amount of light hydrocarbons which may be removed in the subsequent treatment of the gas by a simple form of condenser and scrubber.

In the reaction zone generally defined by compartment I, evaporation of the water content of the sludge takes place (as well as distillation of the lighter hydrocarbons) to the point at which the acid will react on the organic matter of the sludge. There results also in compartment I a sludge body having a sulphuric acid of high concentration, into which the weak feed sludge may be trickled or caused to flow without creating any foaming troubles (a well-known major problem in present commercial methods of treating these sludges). Moreover, the weak feed sludge as it mixes with the sludge body in the first compartment rapidly reaches the proper temperature conditions.

In the reaction zone generally defined by compartment II, the main reaction takes place as aforesaid; and this reaction takes place within a range of temperatures below that at which $SO_3$ is distilled off and below the temperature for the formation of $H_2S$ gas, and at a rate at which the generation of $SO_3$ is obviated. Under any conditions of operation, if $H_2S$ gas is formed in any of the retort compartments, I believe it is further reacted under the conditions therein with the ultimate result of its complete elimination. I believe that it is due to the maintenance of the conditions principally in the compartment II that in addition to these results, cracking or distillation of the heavier hydrocarbons or the distillation of sulphur is obviated or prevented.

In the reaction zone generally defined by compartment III, there takes place the final breaking up of the spongy, globular, carbonaceous residue with further applied heating, the remainder of sulphur dioxide mechanically held in the residue being here driven off and the residue being reduced to a granular fuel which comes out in a very desirable granular state capable of being readily made into powdered fuel, or by suitable treatment, briquetted. I have found that this fuel has a high amount of volatile content, the fuel analysis of certain residues showing as high a content as 65% of volatile matter and 35% of carbon. This latter I believe is due to the relatively low temperatures of disintegration employed in the retort. The sludge mass during treatment passes from a liquid stage to a plastic condition (when the swelling takes place) as it is progressively moved through the retort; and the fuel or carbonaceous residue does not quite lose this plastic condition so that it is expelled from the retort in a cohering yet granular state. This in itself I find to be of a great advantage, because it avoids the formation of dust and the carrying over of dust with the produced gases, and thus eliminates the necessity incident to prior methods of using filtering apparatus for filtering the produced gases. The fact that the produced gases have their exit point at an end of the retort opposite to the discharge end for the carbonaceous residue is also a factor in avoiding the troublesome problem of dust formation and entrainment of the dust by the resulting gases. The physical and chemical condition of the exiting carbonaceous fuel may be controlled by regulating the aforesaid conditioning factors of the process.

It is of great importance in the efficient and economical operation of the apparatus that the process is a continuous one, with the results produced readily controllable by regulating the operating conditions. Thus the temperature ranges in the reaction zones and the character of the end products may be readily obtained by adjusting or controlling either the flow of feed sludge to the retort or the heat generated in the furnace or both, and by adjusting the rotational speed of operation of the retort, all so that there is finally attained a balance in the adjustment which enables the operation to run smoothly and continuously. This enables, furthermore, a ready modification of the reacting conditions to suit the character of the sludge used. Acid sludges, as aforesaid, vary in character and contain sulphuric acid, sulphonic acids, sulphates, tars and oils in different relative proportions. I have found that the process of the present invention is readily varied and adaptable to all kinds of sludges including not only the liquid but also the very heavy and viscous sludges, and that the operating conditions may be readily adjusted to suit the particular kind or variety of sludge employed. A practical test point or index of the attainment of the correct operating conditions for the various sludges is the swelling of the sludge which takes place in the first and second reaction compartments.

Generally considered, it will be manifest that the production of a uniform substantially pure sulphur dioxide on the one hand and an acid-free fuel product containing the optimum fuel value on the other hand results from this controlled operation of the apparatus, and that this is generally dependent only upon carrying out the process in such a way that every particle of the sludge material is heated at a desired rate through the critical temperature range for decomposition of the sulphuric acid content and compounds therein, but not heated to a higher temperature at which the side reactions and objectionable distillations including the destructive distillation of the fuel would take place.

It has been my observation that the rate at which the sludge is brought up to the reaction temperature is important to avoid the formation of any accompanying sulphuric acid distillation. By means of my present process the sludge body is gradually brought up to the higher temperatures, the gradual heating being a factor in avoiding such rapid heating or local overheating as causes a distillation of $SO_3$. I have found that the avoidance of $SO_3$ distillation and the proper generation of $SO_2$ gas is the result of a combination of reasons comprising, first, the fact that at the gas exit end of the retort the temperatures are too low for the distillation of $SO_3$, second, the fact that the range of reacting temperatures is suitably governed, and third, the fact that the rate of bringing up the sludge to the reaction temperatures is gradual and controlled. After the main reaction is carried out, the gradual and controlled heating of the sludge residue is continued so as to expel any occluded gases and at such a temperature as to avoid or obviate any destructive distillation of the fuel. I have even found that the reaction or produced gases practically do not contain any carbon dioxide gas.

The combustion gases employed may be obtained from a variety of sources and may be produced for example from the burning of oil, powdered coal, coke or other heat producing materials. The combustion gases provide an atmosphere in the retort which aids in producing rapid as well as complete reduction and conversion of the sulphur containing compounds to $SO_2$. The combustion gases may and I believe should contain a proportion of oxygen, an oxygen content up to say about 10% being utilizable. It is my belief that the presence of free oxygen may inhibit the formation of $H_2S$ in the retort when it is operated at the critical temperature range. The combustion gases may also be obtained by burning sulphur or hydrogen sulphide or similar sulphur containing compounds or products. The copious evolution of the produced gases in or about the middle section of the retort in all probability provides a protective blanket between these combustion gases and the lighter hydrocarbons distilled off in compartment I of the retort. These combustion gases may have entering temperatures varying from 1500° to 2500° F., and exiting temperatures of 240° to 260° F.

The countercurrent method of flowing the sludge body and the combustion gases is found to be especially applicable to sludges which pass quickly through the tarry stage to a comparatively dry product. Operation on the countercurrent principle, besides resulting in the advantages heretofore mentioned, also effects a greater fuel efficiency since the proper heat exchange between the gases and the sludge body takes place throughout the length of the retort, the sludge body being gradually brought up to the higher temperatures and the combustion gases being gradually brought down to the lower temperatures as these are moved or passed in their opposing directions.

The process of my present invention is applicable to the various kinds of sludges. With certain blended liquid sludges, I am enabled to recover substantially 25% by weight of the sludge as a granular fuel. In the more viscous sludges which contain a higher percentage of tarry matter, a larger recovery or production of fuel is obtained. With the liquid sludges the recovery or production of the sulphur dioxide gas is an important factor in the process. With the heavier sludges, particularly where the acid content of the sludge is low and the fuel content high, the process and apparatus of my invention may be effectively employed to eliminate the acid without attempting to recover the $SO_2$, with the result that only the acid-free fuel of high volatile content is commercially produced. Manifestly, the present process may also be employed for converting the acid tar residue (obtained in present sludge separation methods) into an acid-free fuel instead of the present practice of neutralizing such tar with alkalis or of burning the acid tar without neutralization. In small refineries, the refiner may not be interested in recovering the $SO_2$ from even a liquid sludge; and in such case the process of my present invention may be economically employed for the purpose of obtaining the acid-free fuel. The form of fuel produced by my present process is, as I believe, so economically valuable that it may be desirable to produce the same from other materials than sludge. For example, various low grade liquid hydrocarbons of little economical value may be converted by my process by adding thereto a small percentage of acid, producing a sludge which may be treated in the retort and from which the valuable fuel residue may be recovered.

The practice of my improved process and the operation of the apparatus will in the main be fully apparent from the above detailed description thereof. It will be understood that many variations in the process as well as in the apparatus may be made without departing from the spirit of the invention as defined in the appended claims. It will be understood that the SO₂ gases produced may be used for the production of sulphuric acid, sulphites, liquid SO₂ and the like, or may be expelled without recovery. While I have described the process for use with acid sludge, it will be understood that the process is also applicable to separated sludge acids, the advantages of the invention being more apparent when it is seen that the acid sludge itself can be treated without requiring a preliminary separation of acid sludge into its sludge acid, oil and tar constituents. Manifestly the process may be used with other sludges or bodies containing a recoverable content of sulphur compounds or carbonaceous material. It will be further appreciated that while I prefer to embody all of the principles of the invention in the apparatus and process as described, the process and apparatus may be widely varied to employ any one or a number of these principles in combination to effect any one or a number of the advantages flowing therefrom, all as I have attempted to define in the appended claims.

The claims of the present application are directed to the process of producing the fuel from the sludge. The process of my present invention used for the generation of SO₂ gas or the same combined with the production of an acid-free fuel is separately described and claimed in my copending application Serial No. 568,050, filed October 10, 1931. The retort apparatus of my present invention is separately described and claimed in my companion application Serial No. 568,051, filed October 10, 1931.

I claim:

1. The method of producing an acid-free fuel of high volatile content from acid sludge which consists in heating the acid sludge under gradually increasing temperatures in an atmosphere low in free oxygen effecting thereby a reaction of the sludge with a consequent reduction of the sulphuric acid content or compounds of the sludge to gases, in removing the generated gases from the sphere of reaction, and in controllably maintaining the heat treatment within a temperature range which effects the optimum reduction of said sulphuric acid content or compounds and the subsequent production of an acid-free fuel residue, the temperature range being controllably below such temperatures as produce a destructive distillation of the fuel residue whereby the fuel residue has a high volatile content.

2. The method of producing an acid-free fuel from acid sludge which consists in heating the acid sludge and in carrying on the heat treatment uniformly in increasing temperature zones, one zone being maintained within a lower temperature range for reacting the sludge to reduce the acid content and compounds thereof to SO₂ gas which is eliminated from the sphere of reaction, and another zone being maintained at a higher temperature range for the removal of residual SO₂ gas and for final conditioning to an acid-free fuel of the residue of the sludge.

3. The method of producing an acid-free fuel from acid sludge which consists in directly heating the acid sludge with hot gases in a retort and in carrying on the heat treatment uniformly in increasing graduated temperature zones in said retort, one zone being maintained within a lower temperature range for reacting the sludge to reduce the acid content and compounds thereof to gases which are eliminated from the sphere of reaction, and another zone being maintained at a higher temperature range for the elimination of residual gases and for the final conditioning to an acid-free fuel of the residue of the sludge.

4. The continuous method of producing an acid-free fuel from acid sludge which consists in heating a body of acid sludge in an atmosphere low in free oxygen in a retort and in carrying on the heat treatment uniformly in a plurality of increasing temperature zones, one zone being maintained within a lower temperature range for reacting the sludge to reduce the acid content and compounds thereof to gases which are eliminated from the sphere of reaction, and another zone being maintained at a higher temperature range for the final conditioning to an acid-free fuel of the residue of the sludge, in flowing feed sludge into the sludge body, in flowing the sludge body from the first through the second zones and in removing the acid-free fuel residue from the retort.

5. The method of claim 4 wherein the sludge body and residue are agitated and broken up as they flow through the retort.

6. The method of producing an acid-free fuel from acid sludge which consists in heating the sludge in an atmosphere low in free oxygen with hot combustion gases brought into direct contact with the sludge and in carrying on the heat treatment uniformly in increasing temperature zones, one zone being maintained within a lower temperature range for reacting the sludge to reduce the acid content thereof to gases removable from the sphere of reaction, and another zone being maintained at a higher temperature range for the expelling of any occluded or residual gases from the sludge residue, and in controllably maintaining the temperature conditions of said zones to obtain said reaction and to prevent destructive distillation of the residue, whereby the residue obtained is an acid-free fuel of a high volatile content.

7. The method of producing an acid-free fuel from acid sludge which consists in subjecting the acid sludge directly to the treatment of a heating medium and raising the sludge slowly to a reaction temperature to reduce the acid content and compounds of the sludge to gases which are eliminated from the sphere of reaction, and in carrying on the treatment by flowing the heating medium and the sludge into contact with each other in generally countercurrent directions, the heat treatment being progressively carried on until all of the acid content and compounds are reduced and eliminated, leaving a residue in the form of an acid-free fuel.

8. The method of producing an acid-free fuel from acid sludge which consists in subjecting the sludge directly to the treatment of hot combustion gases and raising the sludge slowly to a reaction temperature to reduce the acid content and compounds of the sludge to gases which are eliminated from the sphere of reaction, and in carrying on the treatment by flowing the combustion gases and the sludge into contact with each other in generally countercurrent directions, the heat treatment being carried on until all of the acid content and compounds are reduced and eliminated, leaving a residue in the form of an acid-free fuel.

9. The continuous method of producing an acid-free fuel from acid sludge which consists in directly heating a body of the sludge with hot gases, in carrying on the heat treatment in a plurality of increasing temperature zones, one zone being maintained at a lower temperature range for reacting the body to convert the acid content and compounds thereof to gases which are eliminated from the sphere of reaction, and another zone being maintained at a higher temperature range for the final treatment of the sludge residue, the said second range being at temperatures which cause the elimination of any occluded or residual gases from the sludge residue and below that temperature which causes destructive distillation of the residue, whereby a residue is produced which consists of an acid-free fuel of high volatile content, in flowing feed sludge into said sludge body, in flowing the sludge body in the direction from the first through the second temperature zones, and in controlling the hot gas and sludge flow so as to controllably maintain the condition of said temperature zones to produce said acid-free fuel.

10. The continuous method of producing an acid-free fuel from acid sludge which consists in directly heating a body of the sludge with hot gases in an atmosphere low in free oxygen, in carrying on the heat treatment in a plurality of increasing temperature zones, one zone being maintained at a lower temperature range for reacting the body to reduce the acid content and compounds thereof to gases which are eliminated from the sphere of reaction, and another zone being maintained at a higher temperature range for the final treatment of the sludge residue, the said second range being at temperatures which cause the elimination of any occluded or residual gases from the sludge residue and below that temperature which causes destructive distillation of the residue, whereby a residue is produced which consists of a granular acid-free fuel of high volatile content, in flowing the sludge body in the direction from the first through the second temperature zones, and in controlling the hot gas and sludge flow so as to controllably maintain the condition of said temperature zones to produce said acid-free fuel.

INGENUIN HECHENBLEIKNER.